(No Model.)
D. L. GLAFLIN, E. R. EDSON & J. B. JESSOP.
FISH TRAP NET.
No. 576,844.            Patented Feb. 9, 1897.
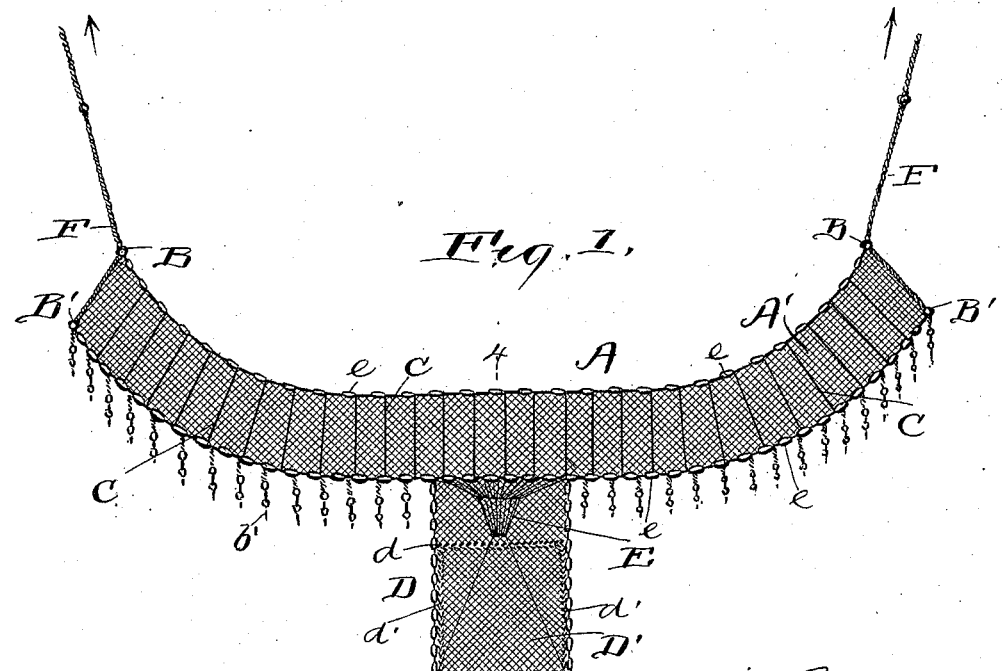
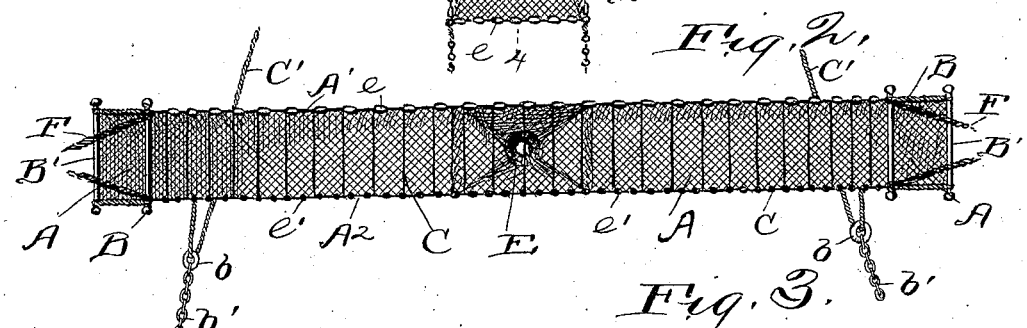
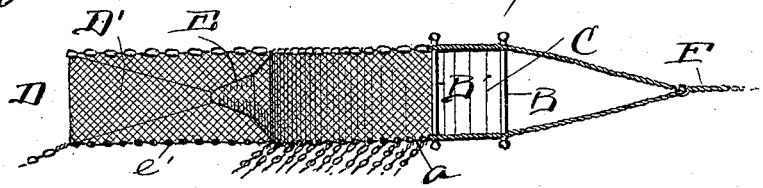
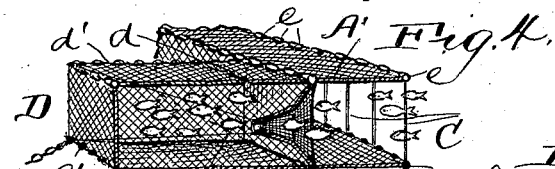
Witnesses,
E. B. Gilchrist
Ella E. Tilden
Inventors,
Daniel L. Glaflin,
Eugene R. Edson and
James B. Jessop.
By Lynch, Dorer & Donnelly
Their attorneys.
THE NORRIS PETERS CO., PHOTO-LITHO., WASHINGTON, D. C.

UNITED STATES PATENT OFFICE.

DANIEL L. GLAFLIN, EUGENE R. EDSON, AND JAMES B. JESSOP, OF CLEVELAND, OHIO.

FISH-TRAP NET.

SPECIFICATION forming part of Letters Patent No. 576,844, dated February 9, 1897.

Application filed April 10, 1896. Serial No. 587,026. (No model.)

*To all whom it may concern:*

Be it known that we, DANIEL L. GLAFLIN, EUGENE R. EDSON, and JAMES B. JESSOP, of Cleveland, Cuyahoga county, Ohio, have invented certain new and useful Improvements in Fish-Trap Nets or Seines; and we do hereby declare the following to be a full, clear, and exact description of the invention, such as will enable others skilled in the art to which it pertains to make and use the same.

Our invention relates to fish-trap nets or seines especially adapted for deep-water fishing; and it consists in the peculiar construction of the same, as will be hereinafter fully set forth and claimed.

In the drawings, Figure 1 is a top plan view illustrating our invention. Fig. 2 is a view in front elevation, and Fig. 3 is a view in side elevation, of a net embodying our invention. Fig. 4 is a sectional perspective view illustrating more clearly the general details of construction and operation.

A represents the sweep-net or trammel, which is provided with what we call "leads" $A'$ $A^2$, one, $A'$, extending horizontally from the top and the other, $A^2$, extending horizontally from the bottom of the sweep or trammel. The rear ends of the leads $A'$ and $A^2$ are secured to the top and bottom, respectively, of the sweep, and the front ends are free excepting as confined by "brails" B B and cords C, which, in connection with the floats, weights, and drags, keep the net in shape. The cords C may extend around the leads and sweep, as shown in Fig. 1. Brails $B'$ $B'$ are provided to keep the ends of the sweep in shape, as shown.

D represents what is known as the "pound," "trap," or "pot," and is located about the central part of the sweep and provided with a conical-shaped tunnel E, leading from the central part of the sweep and into the pound. The pound or trap is kept in shape by suitable floats, weights, and drag-anchors, and is provided with a portion $D'$, which is so laced to the top at $d$ and sides at $d'$ $d'$ as to allow of its being unlaced and rolled back in order to empty it of its contained fish when it becomes desirable or necessary to do so.

The object in providing the sweep with the horizontal leads $A'$ $A^2$ is to lead the fish into the pound or trap through the tunnel E. It is well known that fish when once they strike an obstruction never give up the attempt of trying to work through it, and they will work or swim up and down many times. With our net in doing this they strike the leads $A'$ or $A^2$, and the curve of the sweep caused by the pulling of it through the water forms obstructions at the sides, and hence the fish will in time find their way into the trap or pound D through the tunnel E, from whence they cannot escape. As hereinbefore described, when it is desirable or necessary the trap or pound D is raised and the portion $D'$ of the trap is unlaced and rolled back and the fish may be dumped or taken from the trap.

In Fig. 2 is illustrated our preferred method of securing the drag-anchors to the rear foot-rope $a$ of the sweep A and to the rear of the trap, which is by forming fair-leaders $b$ in the end of the drag-anchors $b'$ and passing lines $C'$ through the same. The free ends of the lines are controlled from the boats. The foregoing construction allows of the nets being raised or lowered in the water, either to fish at different levels or for avoiding obstruction. The trap may be lighted by electric lamp, if desired, in order to attract the fish thereto.

The floats $e$ and weights $e'$ are so located and arranged that the larger floats and heavier weights are secured to the sweep A at the intersection of the same with the horizontal leads $A'$ and $A^2$, respectively, and the smaller floats and lighter weights to the free edges of the leads $A'$ and $A^2$, inasmuch as more is to be supported at the sweep than at the free edges of the leads $A'$ $A^2$, as the strain is greatest at this part when the net is traveling through the water. The cables F F for pulling the net are attached at or near the forward brails B B and extend back to the rear brails $B'$ $B'$, as shown in Figs. 1, 2, and 3.

With a net constructed according to our invention many of the difficulties and objections to the present style of nets are obviated and more fish are caught at any one fishing or trip.

What we claim is—

1. In a fish-net, a sweep formed of netting and provided at its top and bottom with horizontal leads or projecting portions, said leads or portions extending the full length of the sweep, substantially as and for the purpose shown and described.

2. In a fish-net, the combination with the sweep and trap of drag-anchors secured to the said sweep and trap by means of lines passing through fair-leaders located in or connected to the anchors, substantially as and for the purpose shown and described.

3. In a fish-net of the sweep type, the combination with the sweep proper, of an upper and lower lead secured to said sweep and held in open relation by means of brails at either end, cords secured to the open end of the upper and lower leads whereby said leads are retained in proper position, substantially as and for the purpose shown and described.

4. In a fish-net of the sweep or seine type, the combination with the sweep proper, of an upper and lower lead attached at their rear ends to said sweep and brails, and cords for holding such leads in proper position, said sweep having at its central portion a pound, and the pound in turn being provided with a top laced thereto, whereby said top may be gradually unlaced and thrown back in order to remove the fish, substantially as shown and described.

In testimony whereof we sign this specification, in the presence of two witnesses, this 4th day of April, 1896.

DANIEL L. GLAFLIN.
EUGENE R. EDSON.
JAMES B. JESSOP.

Witnesses:
C. G. HARPER,
GEO. C. LOESCH.